350-96.24 SR
E197A XR 3,265,928 TX350-96.24

Aug. 9, 1966 HISASHI NISHINO 3,265,928

RADIANT ENERGY-CONTROLLED SCANNING SYSTEM

Filed Jan. 24, 1963

INVENTOR.
HISASHI NISHINO
BY
Stanley Wolder
ATTORNEY

United States Patent Office 3,265,928

Patented August 9, 1966

3,265,928

RADIANT ENERGY-CONTROLLED SCANNING SYSTEM

Hisashi Nishino, Sakai, Osaka, Japan, assignor to Minolta Camera Co. Ltd., Minami-ku, Osaka, Japan, a corporation of Japan Filed Jan. 24, 1963, Ser. No. 253,546
9 Claims. (Cl. 315—155)

The present invention relates generally to improvements in scanning systems and it relates more particularly to an improved apparatus for transducing a video electric signal into a corresponding visual image.

In transducing the video electrical signal to a visual image in the conventional television receiver a cathode ray tube is generally employed. The cathode ray beam is swept across the face of the tube by vertical and horizontal sweep currents or voltages of predetermined frequencies synchronized by the incoming signal and the intensity of cathode ray beam is modulated in response to the incoming video signal to produce on the screen of the cathode ray tube a visual picture corresponding to the incoming signal. The cathode ray tube although in widespread use in television receivers possesses many major drawbacks and disadvantages. Principal among these is its great bulk, occupying the major part of the volume of the modern television receiver. Among other drawbacks are its high cost, frequent non-linearity, and the difficulties encountered in accurate scanning. There have been many devices proposed for overcoming the drawbacks of the cathode ray tube for use in television receivers but these have not proven satisfactory and have left much to be desired and thus have not been commercially adopted.

It is thus a principal object of the present invention to produce an improved transducer.

Another object of the present invention is to provide an improved electrical scanning system.

Still another object of the present invention is to provide an improved apparatus for transducing an electrical signal into a visual image.

A further object of the present invention is to provide an improved apparatus for transducing a television video electric signal into a visual picture.

Still a further object of the present invention is to provide an improved apparatus of the above nature characterized by its ruggedness, compactness, simplicity, reliability, and ease and convenience of use.

The above and other objects of the present invention will become apparent from a reading of the following description taken in conjunction with the accompanying drawing, wherein.

In a sense the present invention contemplates the provision of an electrical scanning system comprising a plurality of longitudinally spaced transversely extending first grid electrodes, a plurality of transversely spaced longitudinally extending second grid electrodes spaced from said first electrodes, first and second terminal electrodes, means including a photoresponsive element connecting each of said first and second grid electrodes respectively to said first and second terminal electrodes, means applying an electrical signal between said first and second terminal electrodes, and means exposing said photoresponsive elements to a source of light in a predetermined sequence.

According to a preferred form of the present apparatus there is provided a flat rectangular electroluminescent sheet, the first grid electrodes being superimposed on one face of the electroluminescent sheet and the second grid electrodes being superimposed upon the opposite face thereof. The grid electrodes which are superimposed on the front face of the electroluminescent sheet are preferably transparent. The terminal electrodes are defined by bars extending along adjacent edges of the electroluminescent sheet, each of the first grid electrodes being connected though respective first photoresistance elements to one of said bar electrodes and each of the second grid electrodes being connected to the other bar through respective second photoresistance elements. A first light guide extends from each of the first photoresistance elements and terminates along a circular commutation path and a second light guide extends from each of the second photoresistance elements and terminates in a second circular commutation path. The light guides connect successive or alternate first photoresistance elements to successive points on said first commutation path and successive of said second photoresistance elements to successive points on the second commutation path. The commutation paths are swept in any suitable manner by respective circulating light beams to render the first and second photoresistance elements conductive in a predetermined sequence to successively energize the luminescent sheet areas of corresponding crossing grid electrodes and effect the emission of light therefrom in accordance with the concurrent signal strength on the terminal electrodes.

Figure 1:
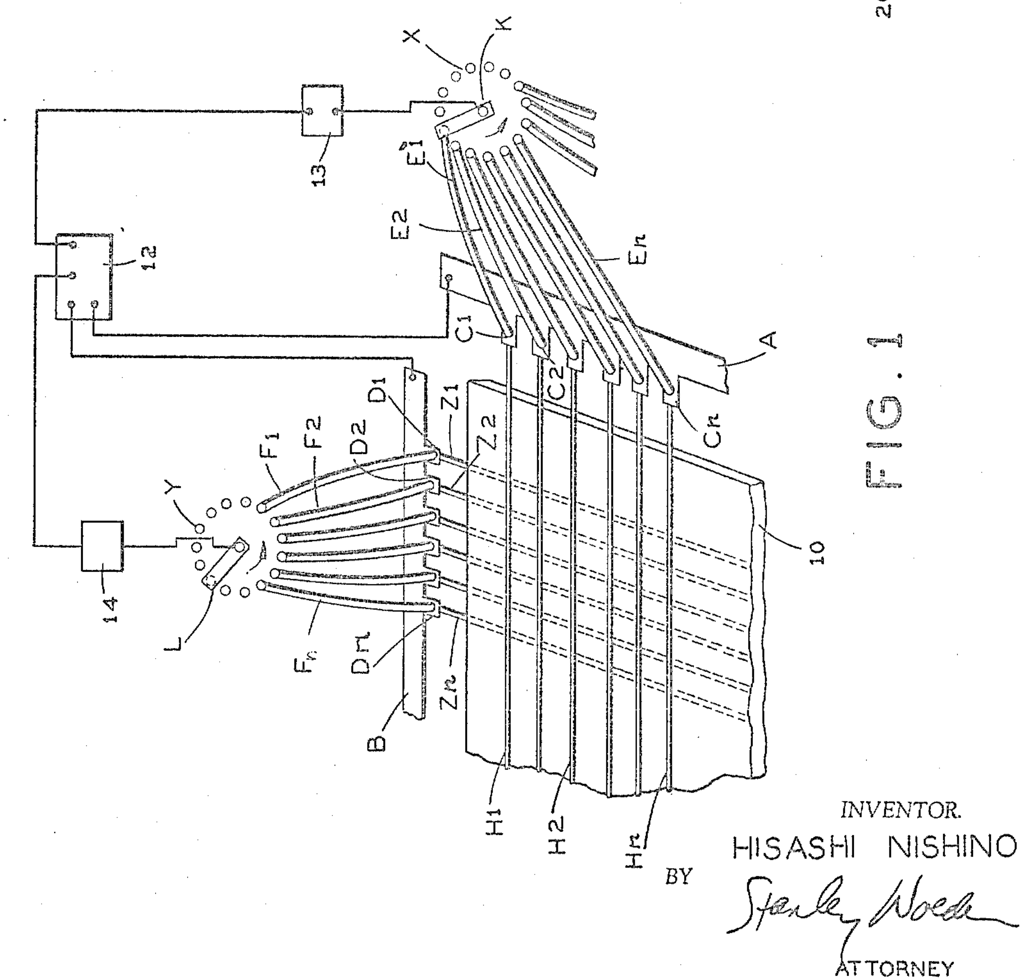
FIGURE 1 is a fragmentary perspective and diagrammatic view of an apparatus embodying the present invention.

Referring now to the drawing, and particularly to FIGURE 1 thereof which illustrates a preferred embodiment of the present invention, the reference numeral 10 generally designates a preferably flat rectangular electroluminescent sheet or screen of any well known composition and construction, emitting visual radiation from areas subjected to an electric energization. Where the sheet 10 is to be employed in the production of a television picture of the type having a 525 line horizontal sweep with 700 increments along each horizontal sweep, that is 525 vertical by 700 horizontal increments or an aggregate of 367,500 picture elements, as is conventional, the ratio of the width of the sheet 10 to the height thereof is 4:3. A plurality of regularly transversely spaced longitudinally extending parallel first grid electrodes $H_1$, $H_2$ . . . $H_n$ are superimposed upon the first face of the luminescent sheet 10 and extend for substantially the full width thereof. A plurality of regularly longitudinally spaced transversely extending second electrodes $Z_1$, $Z_2$ . . . $Z_n$ are superimposed on the rear face of the sheet 10 and extend for substantially the full height thereof and are in quadrature with the first grid electrodes H. The grid electrodes H which are on the front or viewing face of the electroluminescent sheet 10 are preferably transparent and the grid electrodes H and Z may be deposited on the faces of the sheet 10 in any suitable manner such as by vacuum deposition, chemically or the like. When employed in the above identified type of television system there are provided 525 H grid electrodes and 700 Z grid electrodes.

Positioned along and extending substantially the full length of a transverse edge of the electroluminescent sheet 10 is a first elongated terminal electrode A and positioned along and extending substantially the full length of a longitudinal edge of the sheet 10 is a second elongated terminal electrode B. Each of the longitudinal grid electrodes $H_1$, $H_2$ . . . $H_n$ is connected through a corresponding high dark resistance photoresistance cell $C_1, C_2 \ldots C_n$ to the terminal electrode A and each of the transverse grid electrodes $Z_1, Z_2 \ldots Z_n$ is connected through a corresponding high dark resistance photoresistance cell $D_1, D_2 \ldots D_n$ to the terminal electrode B. The photoresistance cells C and D are advantageously cadmium sulphide cells having very small photosensitive elements which exhibit a very high resistance approaching an infinite resistance, in darkness, and a relatively low resistance when exposed to light. The terminal electrodes A and B are connected to a source of video electric signals, such as the video signal output terminals of a television receiver 12.

In order to actuate or energize the gride electrodes H and Z in a predetermined sequence, there is provided a commutation system for scanning the electrodes H and Z. The scanning system includes a first group of fine light guides $E_1, E_2 \ldots E_n$ which have trailing ends registering with respective photoresistance cells $C_1, C_2 \ldots C_n$ and leading ends lying in a substantially flat circular commutation path X. Successive photocells $C_1, C_2 \ldots C_n$ communicate by way of the light guides E with successive points along the commutation path X. The scanning system also includes a second group of fine light guides $F_1, F_2 \ldots F_n$ which have trailing ends registering with respective photocells $D_1, D_2 \ldots D_n$ and leading ends lying in a substantially flat circular commutation path Y. Successive photocells $D_1, D_2 \ldots D_n$ communicate by way of the light guides F with successive points on the commutation path Y. The light guides E and Y may be of any suitable construction, each advantageously being a strand or monofilament or fiber of a transparent material of high index of refraction sheathed in a material of low refractive index. The size of the photoresistance elements are preferably approximately coextensive with the light guides trailing end faces. It should be noted that each of the groups of photocells E and D are in communication with a respective full circle commutation path X and Y.

Associated with the commutation path X is a first light communicating device K which directs a beam of light successively at the leading ends of the light guides E along the path X, the light guides E out of registry with the sweeping light beam being substantially unilluminated. The light communicating device K sweeps the path X at a predetermined frequency established by an associated oscillator 13 which is synchronized by a vertical synchronization signal from the receiver 12. Similarly, associated with the commutation path Y is a second light commutating device L which directs a beam of light successively at the leading ends of the light guides F along the path Y, the light guides F out of registry with the sweeping light beam being substantially unilluminated. The light commutating device L sweeps the path Y at a predetermined frequency established by an oscillator 14 which is synchronized by a horizontal synchronization signal from the receiver 12. In the above type of television system the sweep frequency of the light scanner K or the revolutions per second thereof is equal to the picture frame frequency and the sweep frequency of the scanner L is 525 times the sweep frequency of light scanner K.

Considering now the operation of the apparatus described above, when the scanner K directs a beam of light on a light guide E, the corresponding photocell C is illuminated and rendered conductive to connect a respective grid electrode H to the terminal electrode A. Similarly, when the scanner L directs a beam of light on a light guide F, the corresponding photocell D is illuminated and rendered conductive to connect a respective grid electrode Z to the terminal electrode B. An electric field is thus established at the crossover point of the actuated grid electrodes H and $Z_n$ in a direction substantially perpendicular to the sheet 10 and of an intensity corresponding to the concurrent amplitude of the video signal applied between the electrodes A and B.

The sheet 10 is thus correspondingly energized at the respective crossover point to emit light of an intensity related to the video signal amplitude. As each of the grid electrodes H is actuated by the illumination of a respective photocell C by a light guide E, the full group of grid electrodes Z are successively actuated by successive illumination of the photocells D to thereby effect a full horizontal sweep of the sheet 10 by an electric field which effects the energization of and hence the light radiation from the sheet 10 in accordance with the input signal between electrodes A and B. Each successive horizontal sweep is advanced vertically an increment by reason of the advance of the scanner K to the next successive light guide E so that complete frame area of the sheet 10 is scanned. As the rotation of the scanner K is repeated successive pictures are impressed on the screen 10 in the above manner. It should be noted that additional space may be provided between the leading ends of light guides corresponding to the first and last grid electrodes to allow for the return sweep encountered in the conventional television system.

Figure 2:
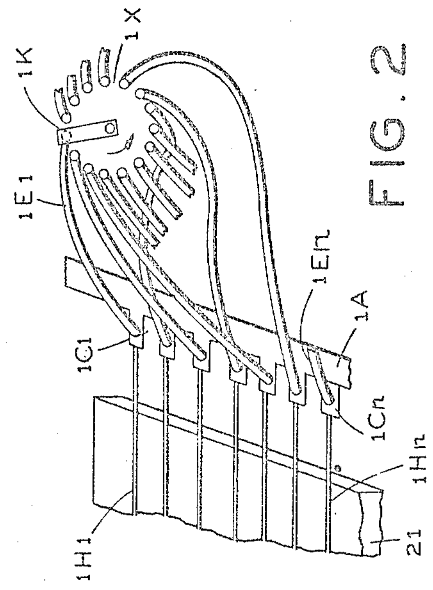
FIGURE 2 is a fragmentary view similar to FIGURE 1 illustrating another form of scanning system.

The apparatus illustrated in FIGURE 2 of the drawing differs from that described above only in the relationship of the longitudinal grid electrodes to the beam scanner. Specifically, each of the longitudinal grid electrodes $1H1 \ldots 1H_n$ on the front face of the electroluminescent sheet 21 is connected to a terminal electrode A1 through respective photoresistance cells $1C1 \ldots 1C_n$. Alternate successive cells 1C communicate by way of corresponding light guides 1E to successive points along a first half of the circular commutation path 1X and the remaining alternate successive cells 1C communicate by way of light guides 1E to successive points along the second half of the commutation path 1X. Thus, with the rotation of the light scanner 1K the grid electrodes are alternately successively scanned, first one set thereof followed by the interdigitating other set thereof. In all other respects the presently described apparatus is similar to that first described.

The mode of operation of the apparatus shown in FIGURE 2 differs from that shown in FIGURE 1 only in that in the apparatus of FIGURE 2 the horizontal sweep is interlaced in the conventional sequence whereas in the apparatus of FIGURE 1 the horizontal sweeps are in successive sequence.

Figure 3:
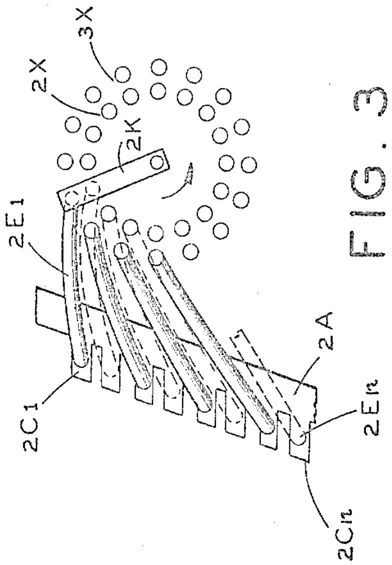
FIGURE 3 is a fragmentary view similar to FIGURE 1 illustrating still another form of scanning system.

In FIGURE 3 of the drawing there is illustrated another form of vertical sweep system in which interlaced horizontal scanning is effected. In this embodiment successive photoresistance cells $2C1 \ldots 2C_n$ which connect the longitudinal grid electrodes to the terminal electrode 2A communicate by way of light guides $2E1 \ldots 2E_n$ alternately to successive points of a pair of concentric commutation paths 2X and 3X respectively. The scanning device 2K is actuated to illuminate successive points along commutation path 2X during alternate revolutions thereof and the successive points along commutation path 3X during the other revolutions thereof. Thus the photoresistance cells 2C are alternately actuated in successive sequences to result in interlaced horizontal scanning.

While there have been described and illustrated preferred embodiments of the present invention, it is apparent that numerous alterations, omissions and additions may be made without departing from the spirit thereof.

What is claimed is:

1. An electrical scanning system comprising a plurality of longitudinally spaced transversely extending first grid electrodes, a plurality of transversely spaced longitudinally extending second grid electrodes spaced from said first electrodes first and second terminal electrodes, means including first photo-resistance elements connecting each of said first grid electrodes to said first terminal electrode, means including second photo-resistance elements connecting said second grid electrodes to said second terminal electrode, means applying an electrical signal between said terminal electrodes, a light guide extending from each of said first photosensitive elements and terminating in a first predetermined sequence along a first commutating path, a light guide extending from each of said second photosensitive elements and terminating in a second predetermined sequence along a second commutating path, means for traversing a light about said first commutating path and means for traversing a light about said second commutating path.

2. A light image producing apparatus comprising an electroluminescent plate, a plurality of regularly longitudinally spaced transversely extending first grid electrodes disposed along one face of said electroluminescent plate, a plurality of regularly transversely spaced longitudinally extending second grid electrodes disposed along the other face of said electroluminescent plate, first and second terminal electrodes, means including first photoresistance elements connecting each of said first grid electrodes to said first terminal electrode, means including second photoresistance elements connecting each of said second grid electrodes to said second terminal electrode, means applying an electrical signal between said terminal electrodes, a light guide extending from each of said first photosensitive elements and terminating in a first predetermined sequence along a first circular commutating path, a light guide extending from each of said second photosensitive elements and terminating in a second predetermined sequence along a second circular commutating path, means for circulating a light about said first commutating path and means for circulating a light about said second commutating path.

3. The apparatus of claim 2 wherein said electroluminescent plate is of substantially rectangular configuration and said terminal electrodes are arranged in quadrature and extend along corresponding edges of said luminescent plate.

4. The apparatus of claim 3 wherein said first and second grid electrodes extend perpendicularly from said first and second terminal electrodes respectively and are connected thereto through corresponding of said first and second photoresistance elements located along said terminal electrodes.

5. The apparatus of claim 2 wherein said light guides extending from successive of said first photoresistance elements terminate at successive points along said first commutating path.

6. The apparatus of claim 2 wherein said light guides extending from successive alternate of said first photoresistance elements terminate at successive points along a first section of said commutation path and the light guides extending from the successive remaining photoresistance elements terminate at successive points along a second section of said commutation path angularly spaced from said first section.

7. The apparatus of claim 2 wherein said light guides extending from successive alternate of aid first photoresistance elements terminate at successive points along a first section of said commutation path and the light guides extending from the successive remaining photoresistance elements terminate at successive points along a second section of said commutation path radially spaced from said first section, said circulating light alternately exposing said first and second sections for a full revolution.

8. The apparatus of claim 2 wherein said first and second light circulating means are synchronized.

9. The apparatus of claim 8 wherein said second light circulating means completes a cycle for each increment advance of said first light circulating means between successive light guides.

References Cited by the Examiner

UNITED STATES PATENTS

| | | | |
|---|---|---|---|
| 2,907,001 | 9/1959 | Loebner | 250—227 |
| 2,967,972 | 1/1961 | Haan | 315—169 X |
| 3,078,373 | 2/1963 | Wittenberg | 315—169 |
| 3,152,257 | 10/1964 | Van Santen et al. | 178—7.6 X |
| 3,169,190 | 2/1965 | Ress | 250—227 X |

JAMES W. LAWRENCE, *Primary Examiner.*

R. SEGAL, *Assistant Examiner.*